United States Patent [19]
Bowman

[11] Patent Number: 4,864,078
[45] Date of Patent: Sep. 5, 1989

[54] ACTIVATION KITS FOR PRESETS

[76] Inventor: Timothy S. Bowman, 2104 Bird St., Parkersburg, W. Va. 26102

[21] Appl. No.: 191,533

[22] Filed: May 9, 1988

[51] Int. Cl.[4] .............................................. H02G 3/08
[52] U.S. Cl. ...................................... 174/48; 439/142
[58] Field of Search ........................... 174/48; 52/221; 362/153; 439/136, 142, 925; 16/115

[56] References Cited

U.S. PATENT DOCUMENTS

| 892,080 | 6/1908 | Pishek | 16/115 |
|---|---|---|---|
| 1,141,122 | 6/1915 | Kliegl | 362/153 |
| 3,318,476 | 5/1967 | Clark | 174/48 X |
| 3,851,674 | 12/1974 | Fork | 52/221 X |
| 4,096,347 | 6/1978 | Penczak et al. | 174/48 |
| 4,443,654 | 4/1984 | Flachbarth et al. | 174/48 |
| 4,591,656 | 5/1986 | Mohr | 174/48 |
| 4,638,115 | 1/1987 | Benscoter | 174/48 |

*Primary Examiner*—Arthur T. Grimley
*Assistant Examiner*—Tone David A.

*Attorney, Agent, or Firm*—Frederick J. Olsson

[57] ABSTRACT

For a preset having a cover and an annular ring supporting the cover, structure to releasably hold the cover in closed position and to move the cover with respect to the ring as between closed and open positions, the structure including a deforming surface on the ring; a deformable head on the cover to engage the surface, the engagement causing the deformable head to deform and generate friction forces sufficient to hold the same against said surface means for holding the cover in closed position but permitting the deformable head to slide relative to the surface means to provide for the cover to be moved out of or into the closed position; an elongated lifting tab on the cover; and the lifting tab being pivotally mounted for movement between an inactive condition and an active condition, in the latter condition part of the tab extending inwardly of the cover and part of the tab extending outwardly of the cover to be grasped by the fingers for moving the cover from closed to open position.

7 Claims, 4 Drawing Sheets

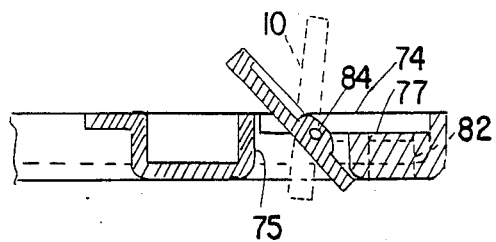
FIG. 10.
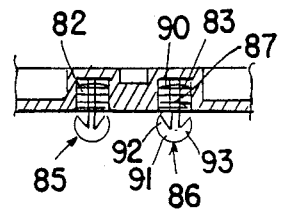
FIG. 11.
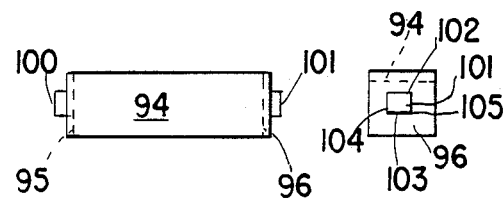
FIG. 12.
FIG. 13.
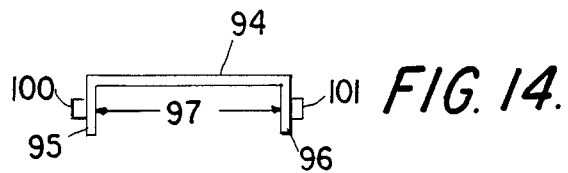
FIG. 14.

ACTIVATION KITS FOR PRESETS

This invention relates in general to electrical underfloor or infloor systems for power and communication distribution in buildings. More specifically, the invention relates to improved activation kits for activating preset access units installed on cellular raceways.

The principle objective of the invention is to promote the useful art of electrical underfloor systems by means of an improved activation kit which overcomes most of the disadvantages now associated with such kits.

Specific objectives of the invention are to:

(a) provide an activation kit having a cover on which a carpet can be mounted without components of the cover or other parts of structure tending to cause fraying of the carpet edges either on the floor or on the cover;

(b) provide an activation kit having a single cover which pivots upwardly to open, the direction of opening being selectable as between one direction or 180° therefrom;

(c) provide an activation kit having a cover which can be opened without the use of a tool;

(d) provide an activation kit having a cover which can be opened by a viewable lifting tab activated simply by pushing down with a finger and then grasping with two fingers and pulling upwardly; and (e) to provide an activation kit having means for holding the cover closed and for moving to an open position by the combination of friction-generating means releasably holding the cover closed and finger-activated means for moving the cover to open position.

The activation kit shown herein is employed with presets for bringing both power and communication cables out of the respective cells and up to a work station on the floor. Normally, such presets have a square or rectangular-shaped access opening over which the kit is disposed. A typical preset is shown in copending application Ser. No. 474,696 entitled "Multi-Service Preset Access Unit for Cellular Raceways" and assigned to the assignee of this invention.

The invention will be described below in connection with the following drawings wherein:

FIG. 10 is a view similar to FIG. 9 with the cover lifting tab being tilted and ready to be grasped for the lifting operation;

FIG. 11 is a sectional view taken along the lines 11—11 in FIG. 7 and illustrating typical friction means for holding the cover in place;

FIG. 12 is a plan view of a wire retainer or cable management block;

FIG. 13 is a side view looking to the left in FIG. 12; and

FIG. 14 is an elevational view looking in a direction towards the top of the paper in FIG. 12.

Figure 1:
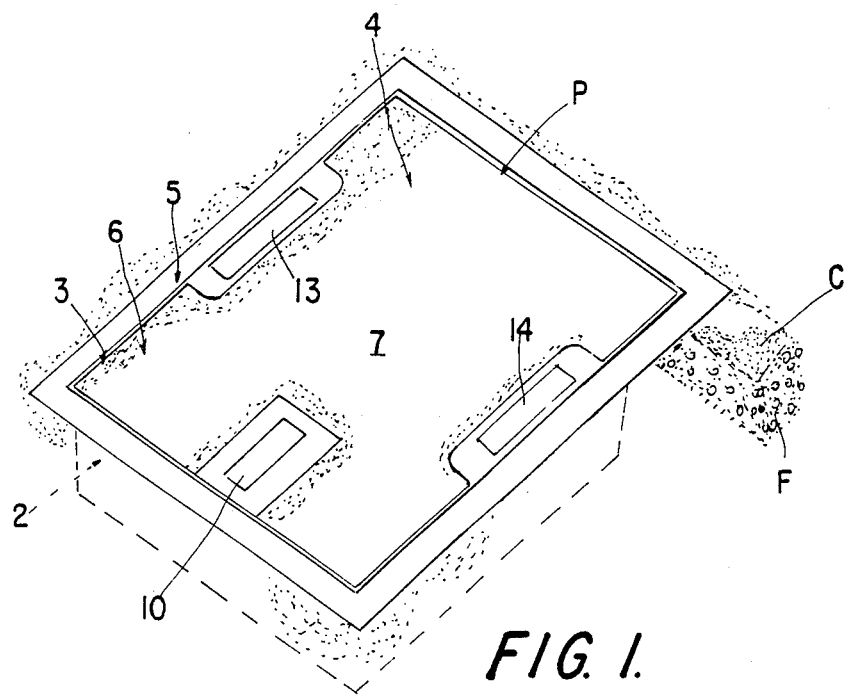
FIG. 1 is a fragmentary perspective view showing the activation kit unit mounted on a preset, the unit being in the closed or inactive condition.
Figure 3:
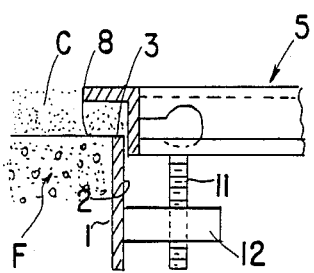
FIG. 3 is a fragmentary view illustrating how the unit is mounted on the floor and connected to the preset.
Figure 2:
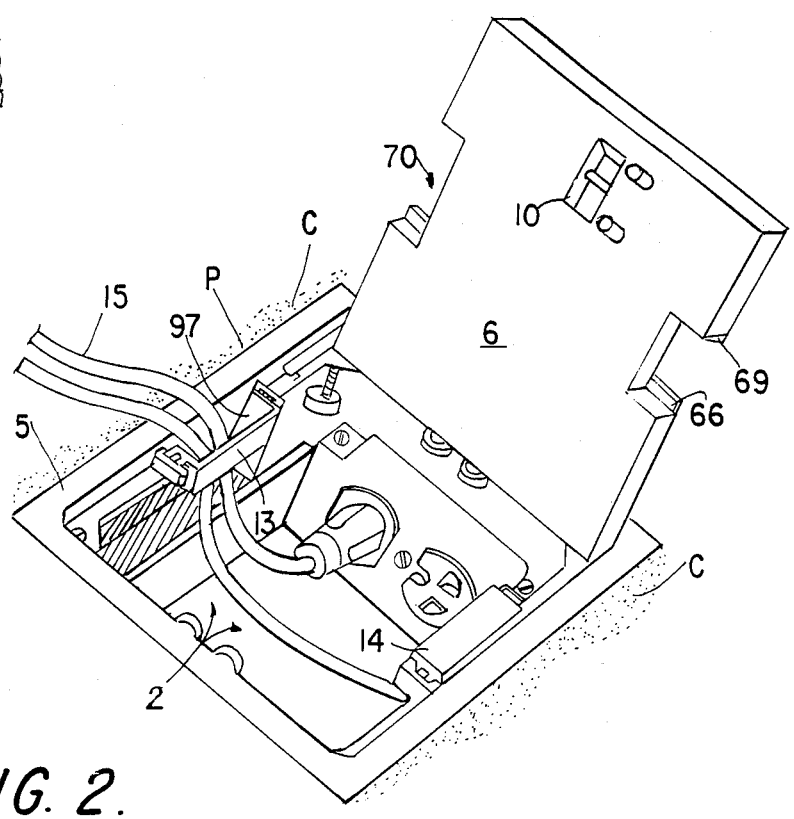
FIG. 2 is a view similar to FIG. 1 with the cover of the unit in open condition with cables being brought out to the floor.

Referring to FIGS. 1-3, a preset P is buried in a concrete floor F. The floor has carpeting C. The preset includes the rectangular or square main section 1 which forms opening 2. The top edge 3 of the main section 1 is flush with the surface of floor F (FIG. 3).

The preset mounts the activation kit or unit 4. The unit 4 comprises a carpet ring 5 nested within the main section 1 and a cover 6 nested within the carpet ring 5. The cover carries a carpet insert 7.

In the position of FIG. 1 the cover is in the closed position where it is held by a friction grip means. The cover 6 is arranged so that it can be tilted or swung from the closed position to the open position as noted in FIG. 2. In the open position, the interior of the preset is accessible for wiring purposes.

The swinging motion of the cover is effected by an arrangement including a rotatable lifting tab 10. In FIG. 1 the lifting tab extends horizontally and is in an inactive condition. One end of the tab can be pushed inwardly of the cover so that part of the tab extends upwardly in a position to be grasped by the fingers and rotated upwardly. The friction grip means which holds the cover in closed position has sufficient force for the holding function while permitting the cover to be pulled away for movement to the open position.

With reference to FIG. 3, the carpet ring 5 is supported by that the carpet flange 8 bears on the portion of carpet surrounding the preset opening 2. The carpet ring 5 is connected to the preset and the flange 8 tightened down on the carpet by a hold down screw located at each corner and threaded into a bracket in the preset. For example, see FIG. 3 where the hold down screw 11 is threaded in the bracket 12.

The unit 4 includes wire retainers or cable management blocks 13 and 14. Such blocks are shown in my copending application Ser. No. 95,437 entitled "Floor Box for Access Floors" and assigned to the assignee of this invention. In FIG. 1, the cable management blocks are positioned for non-use of the preset. In FIG. 2, the cable management block 13 is positioned to permit the exit of cables such as the cables 15.

Figure 4:
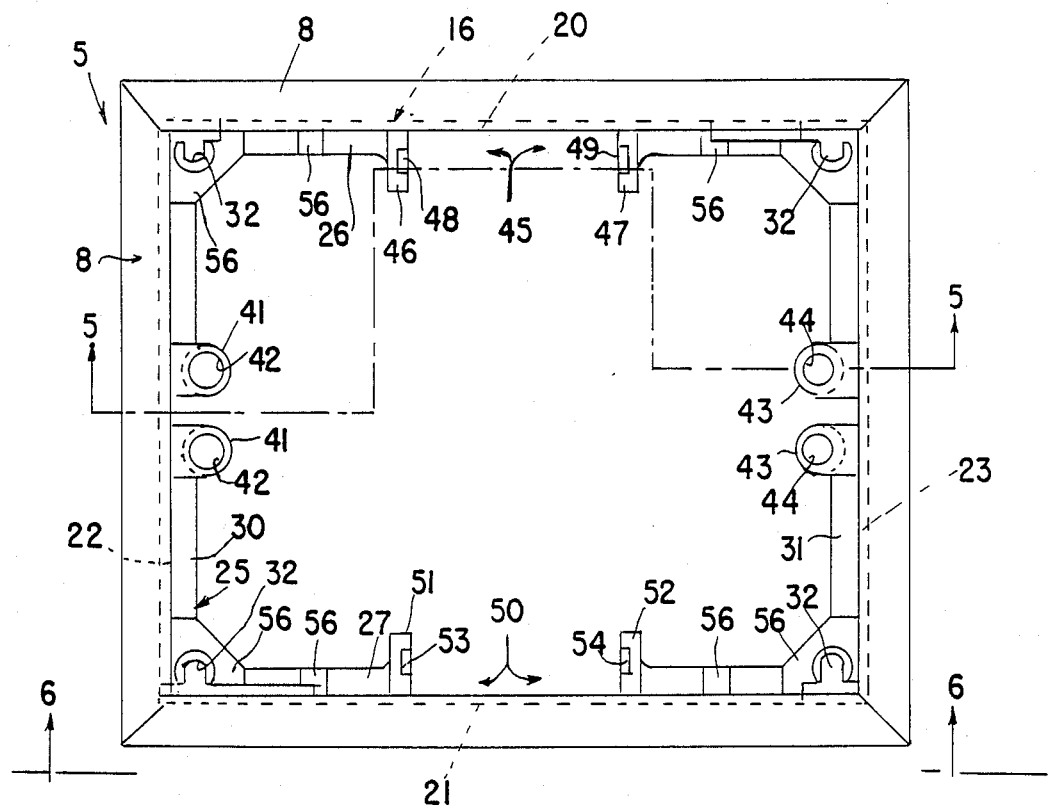
FIG. 4 is a plan view of the carpet ring component of the unit.
Figure 5:
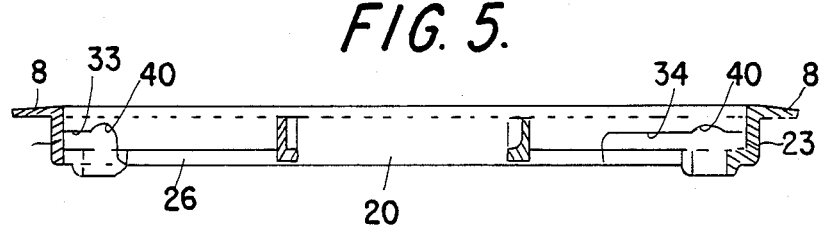
FIG. 5 is a sectional elevational view taken along the line 5—5 of FIG. 4.
Figure 6:
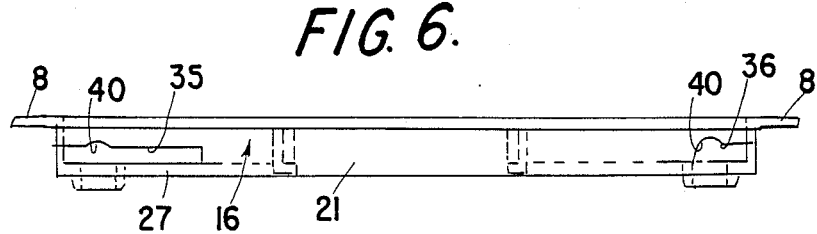
FIG. 6 is a side elevational view as taken along the line 6—6 of FIG. 4.

Referring now to FIGS. 4, 5, and 6, the structure of the carpet ring 5 will now be explained.

The ring 5 has a vertically extending wall 16 which is comprised of a pair of oppositely disposed side walls 20 and 21 and a pair of oppositely disposed end walls 22 and 23. The carpet flange 8 extends horizontally outwardly from the top of the wall 16.

The ring 5 also has a horizontally oriented support flange 25 which extends inwardly from the bottom of wall 16. The flange 25 has a pair of side flanges 26 and 27 respectively connected to the side walls 20 and 21 and a pair of end flanges 30 and 31 respectively connected to the end walls 22 and 23.

At the intersections of the support flanges, there are hold down screw apertures 32. These apertures receive hold down screws 11.

The side wall 20 (FIG. 5) is provided with a pair of pivot slots 33 and 34, the slot 33 being shorter than the slot 34. The side wall 21 has a pair of pivot slots 35 and 36 with the slot 35 being longer than the slot 36.

Note that the short slot 33 and the long slot 35 are located adjacent the respective ends of the end flange 30 while the long slot 34 and short slot 36 are located adjacent the respective ends of the end flange 31. Also note that the top edge of each of the slots 33-36 has a concave detent 40. These slots and detents receive pivot pins on the cover as will be explained later. Note that the positions of the side flanges 26 and 27 adjacent to the pivot slots are cut away. This is for die casting purposes.

The carpet ring carries a portion of the friction grip means for holding down the cover. Flange 30 has a pair of projections 41 having apertures 42. The flange 31 carries identical projections 43 with apertures 44. These apertures receive yieldable ball-like members as will be explained later.

The carpet ring has the means for holding the wire retainer or cable management blocks 13 and 14 in the active or inactive conditions. The flange 26 has a cut out space 45 and at the opposite ends of the spacer are extentions 46 and 47 carrying vertical keyways 48 and 49. The flange 27 has a cut out space 50 and at the opposite ends of the space 50 are extentions 51 and 52 forming the vertical keyways 53 and 54. As noted, the keyways 48, 49, 53, and 54 are open at the top and closed at the bottom.

The top surfaces of the extentions 41 and 43 on the end flanges 30 and 31 are coplanar. The flanges are provided with pads 56 whose surfaces are also coplanar. These various surfaces provide seating means for the cover 6.

Figure 7:
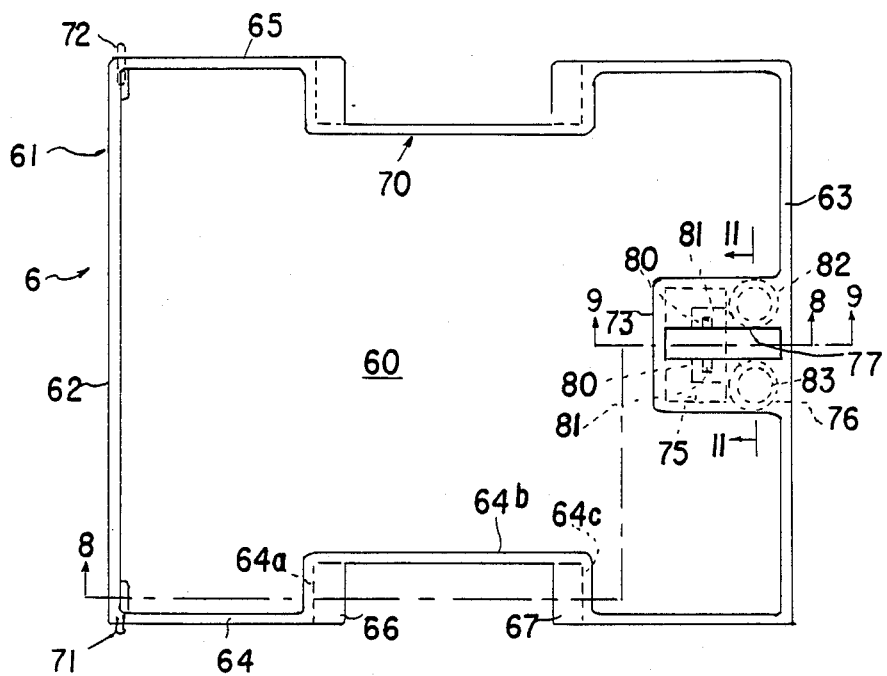
FIG. 7 is a plan view of the lid of the component of the unit.
Figure 8:
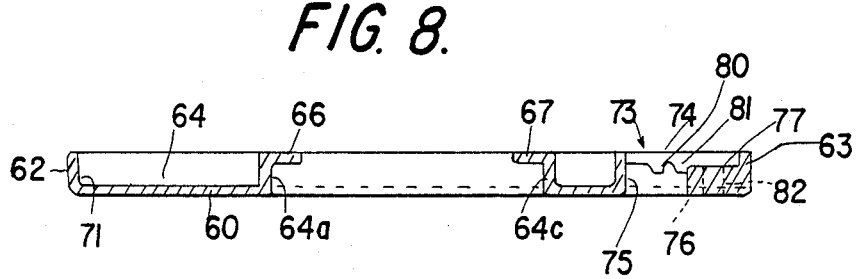
FIG. 8 is a sectional elevational view taken along the line 8—8 of FIG. 7.

Referring to FIGS. 7 and 8, the structure of the cover 6 will be explained.

The cover has a flat bottom 60 and a wall 61 around the periphery of the bottom. The wall 61 is comprised of oppositely disposed end walls 62 and 63 and oppositely disposed side walls 64 and 65.

The side wall 64 has an inwardly offset section formed by walls 64a, 64b, and 64c. At the intersection of the side walls 64a and 64b is an overhang 66 and at the intersection of walls 64b and 64c is an overhang 67. The offset of the wall 64b and the distance between walls 64a and 64c provides space which accomodate the extentions 51 and 52 (FIG. 4) and the cable management block 13 (FIG. 1) with the overhangs 66 and 67 fitting over the top of the extentions 51 and 52 to close off keyways 53 and 54. The side wall 65 has an identical offset section 70.

The flat bottom 60 and the wall 61 forms a cavity for mounting the carpet insert 7. Normally, the top of the carpet insert 7 will be substantially flush with the top of the carpet C on the floor surface.

The means providing for the rotation of the cover between the closed and open positions comprises the pivot pins 71 and 72 which are press fitted into apertures of the end of the wall 62. The pivots 71 and 72 are adapted to fit into the pivot slots 35 and 33 or alternatively fit into the slots 34 and 36.

To insert the pivots, say into slots 35 and 33, the cover is held in a vertical position and at an angle and moved so that the pivot 72 moves into slot 33 and then the cover is twisted so that the pivot 71 moves into the slot 35. At that point the cover can be moved down to the closed position. In the position of the cover just described, the cover moves about an axis extending in a direction along the flange 30. To remove the cover, the same is rotated to a vertical position and then twisted so that the pivot 71 moves out of slot 35 until free of the slot and thus, allows the cover to be pulled free.

To mount the covers with the pivot pins in slots 34 and 36, the cover is held vertically and the pin 72 placed in slot 36 and the cover twisted so that the pin 71 moves into slot 34. Now the cover can rotate about an axis which extends in a direction along flange 31.

From the foregoing description, it will be apparent that the cover can be arranged to open in one direction or to open in a 180° opposite direction.

The means for releasably holding the cover in closed position and for lifting the cover to open position will next be described.

The cover has a mounting section 73 which pivotally mounts the lifting tab 10 and also mounts the deformable means which develops the friction forces for holding the cover in closed position.

The mounting section 73 is located adjacent the cover end wall 63 and is generally rectangular in shape and extends upwardly from the bottom 60 and terminates in a top 74 having a flat surface which, when the cover is closed, is flush with the carpet flange 8 and the top edge 3.

On the underside of the cover, the mounting section is formed with a hollow compartment 75 spaced inwardly from the end wall 63. The space between the hollow compartment 75 and the end wall 63 is a solid member 76.

The mounting section is formed with a lifting tab slot 77 which has an open portion open to the hollow compartment 75 and a closed portion which extends over the solid member 76. The underside of the top 74 is provided with ribs 80 and 81 located respectively on opposite sides of the lifting tab slot 77. These ribs provide metal to be staked over to hold the pivot pin for the lifting tab as will be noted shortly.

The solid member 76 has a pair of mounting apertures 82 and 83. These apertures carry the deformable means which engage the aperture 42 and 44 on the carpet ring as will be described shortly.

The manner in which the lifting tab 10 is mounted and operated will be described in connection with FIGS. 9 and 10.

Figure 9:
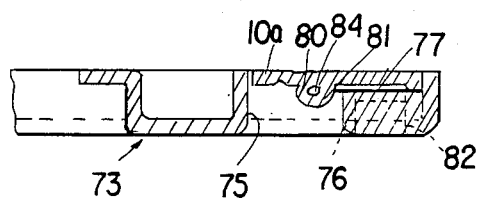
FIG. 9 is an enlarged sectional view taken along the line 9—9 of FIG. 7 and illustrating how the cover lifting tab is mounted, the tab being shown in the inactive condition.

In FIG. 9 a pivot pin 84 extends across the slot 77 with the opposite ends of the pin being staked between the ribs 81 and 82. The pin 84 rotatably mounts the lifting tab 10.

The lifting tab 10 in FIG. 9 is shown in the inactive position in the slot 77. The top surface of the tab is flush with the top surface 74 of the mounting section.

For the cover lifting operation, the portion 10a of the tab is pushed inwardly by the index finger and this causes the tab to rotate counterclockwise. For lifting, the tab is preferably rotated to the vertical position indicated by the dotted lines. In this position, the part of the tab on one side of pin 84 extends down through the hollow compartment 75 and the part on the opposite side of pin 84 extends upwardly of the cover so the same can be grasped by the fingers. The tab can be rotated to the position shown by the full lines wherein the lower end of the tab engages the edge of the hollow compartment 75.

The friction generating means for releasably holding the cover in the closed position will be described next in connection with FIG. 11.

The cavities 82 and 83 respectively contain identical Trelock Nylon plastic fasteners 85 and 86 made by the ITW Fastex Company. With respect to fastener 85, this has a central stem 87 carrying radial fins 90 and a semispherical head 91. The fins 90 are flexible so the same can be pushed into the cavity 82 and assume a slightly bent condition, the latter condition developing a restraining force when an attempt is made to pull the fastener out of the cavity. The semispherical head has a pair of slots 92 and 93. The head is slightly larger than the aperture 42 and 44. When the head is pushed into the aperture the slots 92 and 93 permit the head to deform and this develops friction forces against the wall of the aperture. The force keeps the cover in closed position, but allows the head to slide out of the aperture when the lifting tab 10 is actuated to start the tilting motion of the cover.

Previously, reference was made to the detent 40 on the pivot slots 33-36. These detents are for the purpose of receiving the pivots 71 and 72 when the cover is in the fully open position as shown in FIG. 2. This retains the cover in fully open position.

The wire retainer or cable management blocks 13 and 14 serve the same block-off and cable confining functions as the wire retainer in my copending application Ser. No. 95,437. The structure is different in the retainer herein as it has straight rather than dovetail keys and keyways and a cover platform is omitted.

Referring to FIGS. 12, 13, and 14 the wire retainers 13 includes an elongated body with a top 94 having a continuous surface, a pair of side sections 95 and 96 which extend outwardly from the body and form a space 97. The side sections 95 and 96 carry heads 100 and 101. The heads 100 and 101 are square as noted in FIG. 12. The opposite parallel sides of the heads form keys for example the vertical keys 102-103 and horizontal keys 104-105. The keys are dimensioned to be slightly smaller than the keyways 48-49 and 53-54.

When the vertical keys 104-105 are in keyways 48-49 or keyways 54-54, the top 94 is oriented horizontally or in the blocking position as shown in FIG. 1.

When the horizontal keys 104-105 are in the keyways 48-49 or 53-54, the top 94 is oriented vertically as shown in FIG. 2. The space 97 permits the exit of the cables 15. The retainer confines the cables so that the cover 6 can be opened and closed without interference.

I claim:

1. In an electrical box having a cover and an annular ring supporting the cover for movement between closed and open positions:
   deforming surface means formed on said ring;
   deformable means on said cover to engage said surface means, the engagement causing the deformable means to deform and generate friction forces sufficient to hold the same against said surface means for holding the cover in closed position but permitting the deformable means to slide relative to the surface means to provide for the cover to be moved out of or into the closed position; and
   means on the cover for use in moving the cover from said closed position to an open position.

2. A construction in accordance with claim 1 wherein:
   said deforming surface means comprises a pair of cylindrically shaped bores; and
   said deformable means comprises a pair of semispherical shaped heads of greater diameter than said bores to respectively be inserted into said bores, each head having a pair of slots which permit the head to deform upon being inserted in the bore.

3. An activation kit for an underfloor preset comprising:
   an annular carpet ring having a carpet flange extending outwardly thereof for use in extending over floor carpet on the floor in which the reset is used;
   a cover formed with a cavity for retaining a section of carpet, the cavity forming a protective means for the edge of the section of carpet;
   means mounting the cover on the carpet ring for swinging motion between a closed position and an open position to provide access to the preset with which the kit is used;
   means on said carpet ring and on said cover and operative when the cover is in the closed position to generate friction forces for holding the carpet ring and cover together but providing for relative sliding motion as between the cover and ring whereby the cover can be moved as between the closed and open positions; and
   means on the cover for use in moving the cover from said closed position t o an opening position.

4. An activation kit for an underfloor preset comprising:
   an annular carpet ring having a carpet flange extending outwardly thereof for use in extending over floor carpet on the floor in which the preset is used;
   a cover formed with a carpet cavity for retaining a section of carpet, the cavity forming a protective means for the edge of the section of carpet;
   first and second means on said carpet ring alternatively useable for mounting said cover on the ring for swinging motion between closed and open positions to provide access to the preset with which the kit is used and when said first means is used, the cover swings in one direction to the open position and when the second means is used, the cover swings in the opposite direction to the open position;
   first and second surface means on said carpet ring alternatively useable to be engaged by deformable means on the cover to generate friction forces holding the cover in closed condition but providing for relative sliding motion between ring and cover whereby the cover can be moved as between closed or open position;
   first and second deformable means on said cover to alternatively engage said first or second surface means to generate said friction forces; and means on the cover for use in moving the cover from said closed position to an open position.

5. An activation kit for a preset comprising a rectangularly-shaped carpet ring and a rectangularly-shaped cover mounted therein:
   the carpet ring comprising:
   (a) wall means having a pair of oppositely disposed side walls and a pair of oppositely disposed end walls;
   (b) carpet flange means on said wall means and extending outwardly thereof;
   (c) support flange means having a pair of side flanges connected to said side walls and a pair of end flanges oriented to said end walls;

(d) hold down screw apertures respectively formed at the intersections of side flanges and end flanges;
(e) deforming surface means formed on one of said end flanges;
(f) adjacent the opposite ends of the other of said end flanges, the respective side walls being formed with pivot slots, the pivot slot in one side wall being greater in length than the other pivot slot;

the cover comprising:
(g) a flat bottom;
(h) wall means around the periphery of the bottom and having a pair of oppositely disposed side walls and a pair of oppositely disposed end walls, the bottom and the wall means forming a cavity for mounting a carpet insert;
(i) adjacent each opposite end of one of the cover end walls, a pivot pin extending outwardly thereof and respectively into said ring pivot slots and mounting the cover for swinging motion between a closed position and an open position to provide access to the preset with which the kit is used;
(j) an elongated lifting tab;
(k) means pivotally mounting the lifting tab for movement between an inactive condition wherein tab is substantially flush with said carpet edge protector flange and an open condition wherein the tab extends outwardly of the cover to be grasped by the fingers to rotate the cover around said pivot pins;
(l) means providing a passageway for cables; and
(m) deformable means engaging said deforming surface and assuming a deformed condition to generate friction forces for holding the carpet ring and cover together but providing for relative sliding motion as between the cover and ring whereby the cover can be moved as between the closed and open positions.

6. The activation kit of claim 5 wherein said lifting tab is disposed adjacent the other of said cover end walls and wherein the means pivotably mounting the lifting tab comprises:
  a mounting section disposed adjacent said other cover end wall and extending outwardly of said bottom and terminating in an outer surface flush with said carpet flange means;
  the mounting section being formed with a hollow compartment which is spaced from said other cover end wall and in the space between the hollow compartment and the other cover end wall the mounting section being solid;
  the mounting section being formed with a lifting tab slot having an open portion open to said hollow compartment and a closed portion; and
  a pivot pin in said hollow compartment and mounted on the mounting section and extending across said slot and rotatably mounting said lifting tab, the tab in said inactive condition being disposed in said lifting tab slot and in the active condition part of the tab on one side of the pivot pin being disposed in said hollow compartment and the part on the other side of the pivot pin extending outwardly of the cover.

7. The activation kit of claim 5 wherein:
said deforming surface means on the carpet ring comprises a pair of apertures formed on one of said end flanges and wherein the deformable means on said cover comprising a pair of yielding members, which, when disposed in said apertures, are deformed so as to generate firm but yieldable friction forces on the walls of said apertures.

* * * * *